Figure 1:
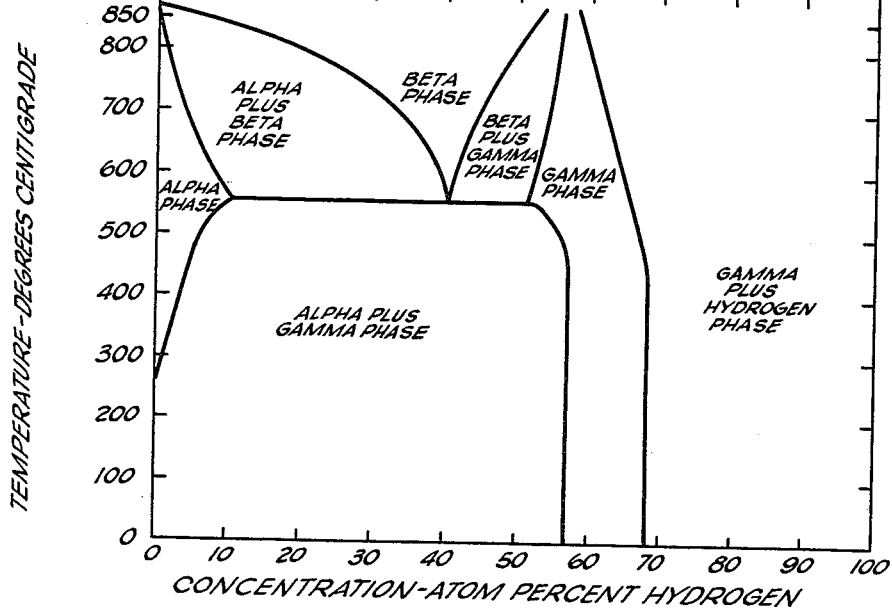

Inventors
Massoud T. Simnad
Jack C. Bokros
Harvey P. Sleeper, Jr.

By Soans, Anderson, Luedeka & Fitch
Attys

United States Patent Office 3,135,697
Patented June 2, 1964

3,135,697
METHOD OF HYDRIDING
Massoud T. Simnad, San Diego, Jack C. Bokros, Encinitas, and Harvey P. Sleeper, Jr., Solana Beach, Calif., assignors to General Dynamics Corporation, New York, N.Y., a corporation of Delaware
Filed June 9, 1960, Ser. No. 34,964
13 Claims. (Cl. 252—301.1)

The present invention generally relates to the hydriding of zirconium and more particularly relates to a method of uniformly hydriding solid pieces of zirconium and zirconium alloys of substantial size without substantial cracking thereof.

Hydrides of zirconium and zirconium alloys are becoming important for various applications, particularly in the field of reactor engineering, that is, in reactor cores and the like. Conventional methods of preparing such hydrides generally yield the hydrides in the form of small irregularly shaped pieces or powders. In this connection, zirconium and zirconium alloys when hydrided under conventional hydriding conditions are usually subjected to considerable stresses and strains. When the zirconium metal or alloy is initially present in pieces of substantial size, cracks and fissures usually occur therein during hydriding, and as the hydriding proceeds the pieces tend to break down into small pieces. The small pieces of the hydrides which are usually obtained are ordinarily not utilizable without further processing.

Accordingly, it is common practice to hydride zirconium and zirconium alloys in the form of fine particles or powder rather than attempting to hydride larger pieces of the metal and alloy, and it is possible to thereafter process the resultant hydride particles or powder to a more readily utilizable form, that is, larger solid size, as by forming or shaping operations. The processing steps necessary to fabricate these hydride pieces of small size and powder into finished utilizable form are relatively complicated and time consuming, due to the physical characteristics of the hydrides. In addition, when carrying out conventional forming and shaping operations on the hydride, the hydrogen in the hydride has a pronounced tendency to dissociate from the zirconium or zirconium alloy.

The foregoing difficulties in connection with the preparation of zirconium hydrides and hydrides of zirconium alloys in utilizable solid form of substantial size have been overcome by the method of the present invention.

This method allows pieces of zirconium and zirconium alloys to be fabricated to the approximate size and shape desired for the finished zirconium hydride or hydride of zirconium alloy, and then be hydrided in a manner which prevents cracking and distorting of the pieces in any way, except for a predictable expansion in size due to the addition of the hydrogen to the zirconium during the hydriding process. Where a zirconium alloy is utilized, the hydriding conditions of this method are such that the hydriding is essentially that of the zirconium in the alloy.

Fully fabricated hydrides of zirconium or zirconium alloy of any desired shape and size, within fairly small tolerances, can be produced by the method of the present invention. Moreover, such hydride pieces have a uniform distribution of hydrogen therethrough and the hydrogen to zirconium atom ratio thereof can be carefully controlled, and may be relatively high, up to about 1.9.

Zirconium hydride pieces of such high hydrogen-to-zirconium atom ratio are of great importance in fuel elements in that fission product migration is reduced, thermal conductivity is increased and the fuel elements can be of smaller size than conventional fuel elements while providing high power levels.

By utilizing the method of the present invention, any desired forming operations can be performed on the relatively easily fabricable zirconium metal or zirconium alloy and the necessity of carrying out such operations on the difficultly fabricable hydrides is obviated. Moreover, the method of the present invention is relatively simple and inexpensive, and can be carried out with relatively simple equipment to yield high quality solid pieces of zirconium hydrides.

Figure 2:
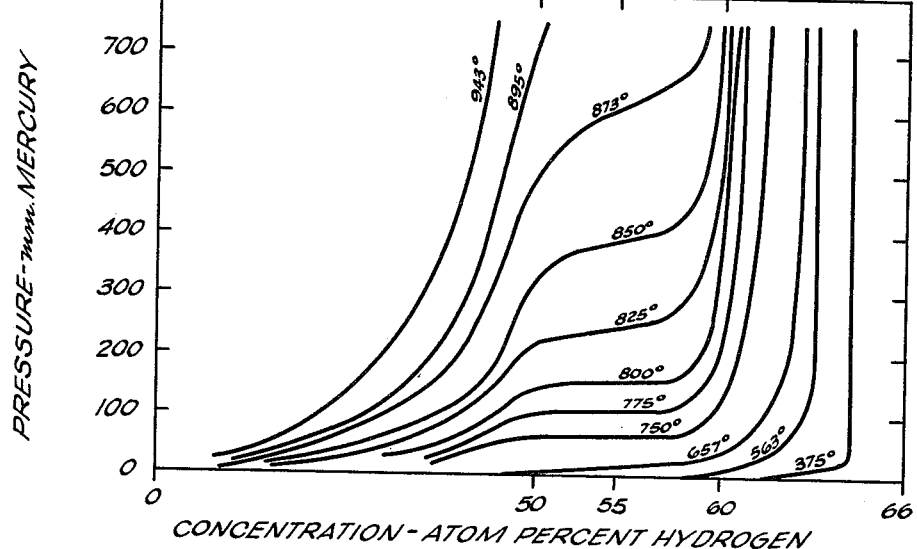

Accordingly, it is the principal object of the present invention to provide a method for preparing hydrides of zirconium and zirconium alloys in solid form, of any desired size and shape. It is also an object of the present invention to provide a simple inexpensive method of hydriding to a controlled high degree, solid pieces of zirconium and zirconium alloys of any desired size without producing cracks, voids, or other distortions therein. It is a further object of the present invention to provide a method of preparing fully fabricated zirconium hydrides and hydrides of zirconium alloy without forming or shaping the hydrides. In the accompanying drawings, FIGURE 1 is a zirconium hydrogen phase diagram, while FIGURE 2 illustrates a plurality of pressure-hydrogen concentration isotherms.

The method of the present invention essentially comprises hydriding solid pieces of zirconium metal or zirconium alloy under controlled temperature and hydrogen conditions in a controlled environment to produce the hydride thereof in solid form. The pressure or rate of admission of hydrogen into contact with the zirconium metal or alloy is carefully controlled so that cracking of the piece does not occur and so that the hydriding is completed in a selected high hydrogen-to-zirconium ratio phase of the solid zirconium-hydrogen solution at progressively decreasing temperatures.

Hydriding may be carried out, in accordance with the method of the present invention, either on zirconium metal or on a suitable alloy of zirconium, for example, a zirconium-uranium alloy, wherein the alloying metal is present in a minor amount. An example is zirconium-uranium alloy containing 8 percent by weight of uranium. Other suitable zirconium alloys may also be hydrided in accordance with the method of the present invention.

The zirconium or zirconium alloy may be in any desired form, as in a fully fabricated form, such as a finished rod, plate or the like, and of any desired size. Rods of 1 inch in diameter can be successfully hydrided, as well as smaller size rods, and the like. However, it has been found that if the diameter of the piece is greater than about 1 inch, satisfactory hydriding to hydrogen-to-zirconium atom ratios of 1.5 or more cannot be carried out in a reasonable amount of time. Accordingly, pieces having external diameters greater than 1 inch and which are to be hydrided to 1.5 or more hydrogen-zirconium ratio are center drilled in accordance with the present invention so that the resulting wall thickness is not more than 1 inch. The piece of zirconium or zirconium alloy to be hydrided should be solid i.e. without internal cracks, fissures or voids. Preferably, it should not have an unusually large grain size or other typical physical characteristics, such as are found in some "as-cast" materials. In general, the degree of hydrogen absorption obtainable with satisfactory results will decrease with increasing content of the alloying metal in the zirconium alloy as indicated. The size and shape of the metal or alloy piece affect the rate of hydriding and the concentration of hydrogen which can be readily added. With the preceding requirements, however, hydriding can be successfully carried out on pieces of any suitable shape and to atom ratios of hydrogen to zirconium of up to about 1.9.

The volume expansion of zirconium and zirconium alloys during hydriding can be calculated from the known densities of various forms of zirconium metal, various alloys thereof and the hydrides thereof. However, in calculating the size and shape to which the zirconium metal or alloy is to be fabricated in order to provide a piece of hydride of the desired size and shape, the linear expansion of the metal or alloy during hydriding must be taken into account. Such linear expansion may be anisotropic and, in general, is a function of the previous history of the piece. Various forming operations, such as drawing, rolling and the like, to which the metal or alloy has been subjected, tend to affect the degree of linear expansion which occurs during hydriding of the metal or alloy. One generally desires the solid zirconium hydride to be of accurate final dimensions without requiring machining operations after the hydriding procedures because of the brittle character of the zirconium hydride. If accurate final dimensions are required in producing a hydride of zirconium or zirconium alloy of a certain size and shape, the necessary allowance for expansion during hydriding is preferably predetermined experimentally on similarly worked pieces of the zirconium metal or alloy.

It is possible, therefore, to work and shape zirconium metal or alloy pieces so that the hydride thereof obtained by practicing the method of the present invention is in the desired size and shape, within fairly small tolerances, and necessitates no separate working or shaping after the hydriding. This is an important advantage, not only because of the difficulty in working the zirconium hydride but also because of the hydrogen loss which normally occurs during working and shaping of the hydride at elevated temperatures. All forming procedures are applied to the zirconium metal and alloys, which can be worked and shaped by conventional procedures, and the hydride is obtained in a solid, fully finished form by a procedure which results in a considerable reduction in cost and time.

Although the present invention is particularly directed to the production of solid pieces of zirconium hydrides of controlled shape and size, it is obvious that working and shaping operations need not be carried out on the zirconium metal or alloy, if it is not desired to obtain the hydride in a particular size and shape. In such event, any solid piece of zirconium metal or alloy can be utilized in the method of the present invention. The resultant hydride will be solid and have a uniform concentration of hydrogen therein when hydrided in accordance with the method of the present invention.

When hydriding is carried out, the surface of the zirconium metal or alloy should be clean of dirt, etc. and also as free as possible from contaminants, particularly those which hamper the diffusion of hydrogen into the zirconium. Such contaminants are usually compounds of non-metals with zirconium, for example, zirconium oxide. Also, various metals may be present as contaminants. Accordingly, it is preferred to clean the surface of the metal or alloy with suitable cleaning agents. In a preferred procedure, the metal or alloy is degreased in a suitable solvent, such as liquid trichlorethylene. While immersed in the solvent, it can be abraded, as by steel wool, to aid in removing contaminants. It can then be treated with an aqueous solution of nitric and hydrofluoric acid, or other suitable reagent to substantially remove contaminants such as copper, oxides, etc. which interfere with the diffusion of hydrogen into the zirconium. After the surface is cleaned, it may be washed with distilled water until free of the acid mixture or other cleaning agent, rinsed in an alcohol bath and then dried. It is now ready to be hydrided.

In carrying out this hydriding procedure, the zirconium metal or alloy piece is first placed within a reaction chamber and subjected to a controlled high vacuum, preferably of not more than about 5 microns of mercury. The reaction chamber itself should be clean and substantially free of contaminants. Thus, the chamber may be first cleaned with acetone, ethyl alcohol or other solvent, dried and then outgassed, at elevated temperature while under a vacuum. The chamber contains a molybdenum or other suitable holder or boat for holding the piece, which boat is also cleaned in a suitable manner, as by vapor blasting and acetone or alcohol washing, followed by drying.

Thus, the piece is maintained as free as practicable from undesired compounds which would deleteriously react with the piece or which would be absorbed by it before and/or during hydriding. In this connection, it is desired to eliminate as far as possible the formation of compounds which would interfere with the diffusion of hydrogen into the zirconium or which would otherwise impede the hydriding.

The reaction chamber may comprise any suitable apparatus capable of holding the piece and of establishing and maintaining the controlled atmosphere and hydriding conditions, for example, a sealed mullite furnace tube. Whatever hydriding apparatus is utilized, it should be isolatable from the atmosphere and should include means for heating the metal or alloy and for controlling the rate of introduction of hydrogen into the system. It should preferably include a purification train for controlling the purity of introduced hydrogen, etc. A pumping system should be included for evacuation of the chamber. Electric heating coils and a thermocouple and/or other means for measuring and controlling the temperature in the system should be present. In addition, it is desirable to provide for measuring the pressure of the system, such as a pressure gauge.

After the zirconium metal or alloy is placed within the hydriding apparatus and the desired controlled vacuum has been provided in a conventional manner, by evacuating the apparatus with a pump to a low pressure of several microns of mercury, temperature of the zirconium metal or alloy piece is increased over a suitable period of time, for example, 1 to 3 hours, to a selected hydriding temperature, as by the heating unit of the apparatus. The temperature throughout the piece should be uniform during the heating. An initial hydriding temperature within the range of from about 760° C. to about 800° C. is preferably employed, although other hydriding temperatures can be utilized. Hydrogen is then admitted to the apparatus and into contact with the piece at a controlled rate to bring about hydriding without cracking, scaling, etc.

Commercially pure hydrogen which has been further purified may be employed. Such further purification may be achieved, for example, by passing the hydrogen over activated charcoal at a low temperature, such as about −195° C. Such purified hydrogen is substantially devoid of hydriding rate-reducing contaminants. The hydriding rate is carefully controlled, by adjustment of the hydriding temperatures and the volume i.e., pressure, of hydrogen in contact with the piece, as hereinafter more fully described.

The hydriding of zirconium and zirconium alloys is an exothermic reaction. Accordingly, after the hydriding temperature in the reaction chamber is reached, the heating unit of the apparatus may be reduced in output or shut off so as to maintain the desired temperature conditions with the aid of the heat evolved from the exothermic reaction.

Reference is now made to FIGURE 1 of the accompanying drawings, which figure depicts a zirconium-hydrogen phase diagram, hydrogen concentration in zirconium being plotted against various hydriding temperatures. It will be seen from FIGURE 1, that zirconium during hydriding passes through a number of distinct phases, depending on the particular hydriding temperature. Zirconium at a temperature below 863° C. is initially present as a solid solution in the alpha phase when hydrided, which phase is an allotropic form characterized by hexagonal close packed crystals. Zirconium when increased to a temperature above 863° C. and below its melting point of 1845° C. during hydriding, is initially present as a solid solution in the beta phase, a body-centered cubic allotropic form.

When hydriding of zirconium takes place at temperatures below 560° C., the system passes from the alpha region directly into a two-phase region, that is, the alpha plus gamma field. This phase comprises a mechanical mixture of alpha zirconium as a solid solution and gamma zirconium hydride. During hydriding of zirconium, at temperatures above 560° C. and below 863° C., the system passes from the alpha region directly into the alpha plus beta two-phase region. It is an important part of the present invention to carry out hydriding so that the gamma phase, i.e., gamma zirconium, is ultimately obtained, hydriding proceeding in the gamma phase to the desired hydrogen-to-zirconium ratio by progressively decreasing the temperature of the reaction chamber during hydriding.

Although the rate of diffusion of hydrogen into zirconium or zirconium alloy increases with temperature, the maximum concentration of hydrogen which can be obtained in the metal or alloy at a given pressure decreases as the hydriding temperature rises. Such latter effect can be readily seen in FIGURE 2 of the accompanying drawings, which sets forth a family of curves representing zirconium-hydrogen absorption isotherms, the equilibrium concentration of hydrogen in zirconium having been plotted against hydrogen pressure for a number of operating temperatures.

It has been found that initial hydriding temperatures below about 700° C are usually impractical because of the extremely low hydriding rates afforded at such low hydriding temperatures. Accordingly initial hydriding temperatures above about 700° C. are to be utilized. Conversely, initial hydriding temperatures above about 950° C. are not advantageous, due in part to the relatively low maximum concentration of hydrogen in the gamma phase. As previously indicated, temperatures within the range of from about 750–760° C. to 800° C. are preferred, due to the relatively rapid hydriding rate and also the reasonably high maximum hydrogen concentration in the gamma zirconium phase.

Again referring to FIGURE 1 of the accompanying drawings, it will be seen that when hydriding of zirconium is carried out at temperatures above about 560° C., alpha zirconium is rapidly converted to beta zirconium. Beta zirconium has the ability to absorb substantial quantities of hydrogen, with accompanying expansion of size, the saturation point of the beta solid solution depending upon the particular hydriding temperature. Thus, for example, at about 800° C., the saturation point of the beta solid solution is reached when the hydrogen concentration within the solid solution is about 50 atom percent. As the hydriding temperature increases, the saturation point of the beta solid solution also somewhat increases.

When the saturation point for hydrogen within the beta solid solution is reached for a given temperature, further additions of hydrogen to the system under increased hydrogen pressure result in the formation of a two phase system comprising the saturated beta zirconium and gamma zirconium hydride. This may be seen from the phase diagram of FIGURE 1.

The hydriding of zirconium can be continued under increased hydrogen pressure to the limit of the hydrogen concentration specified in the graph of FIGURE 2 for the particular operating temperature and maximum system hydrogen pressure. Thus, when the operating temperature is about 800° C. the hydrogen concentration can be increased from 50 atom percent, which is the saturation point of the beta solid solution, to a maximum hydrogen concentration of about 60 atom percent, by increasing the hydrogen pressure in the system up to about one atmosphere. This causes the zirconium hydrogen alloy to enter the gamma zirconium phase, as shown in FIGURE 1.

However, in order to minimize cracking of the zirconium metal or alloy, it has been found that the initial hydriding should be conducted in such a manner that substantially all of the zirconium present is first hydrided to the saturation point of the beta solid solution shown in FIGURE 1 prior to any substantial hydriding in the gamma phase. Since the hydrogen concentration is greatest at the surface of the alloy during hydriding, this may be accomplished by maintaining the hydrogen pressure at the surface of the alloy below the equilibrium dissociation pressure of the saturated beta solid solution at the surface temperature. Such limiting pressure for a given operating temperature may be readily determined from FIGURES 1 and 2.

It is preferable that the beta zirconium should be substantially saturated with hydrogen at the operating temperature before any substantial proportion of the zirconium hydrogen alloy is allowed to go into the gamma phase. This is in view of the fact that beta zirconium is relatively ductile and does not have a tendency to readily crack. However, gamma zirconium hydride is relatively more brittle and has a somewhat greater tendency to crack, particularly when both beta zirconium and gamma zirconium are forming simultaneously. If the hydrogen pressure is allowed to increase too rapidly, the outer layers of the zirconium metal or alloy will be converted to gamma zirconium hydride while the inner portions of the metal are still expanding due to hydrogen absorption in the beta phase. Such hydrogen concentration gradients in the metal piece materially increase chances of the metal piece cracking. Accordingly, the hydrogen pressure increase should be regulated so that hydriding in each phase is substantially complete before hydriding substantially occurs in the next phase.

As indicated above, the dissociation pressure for a saturated beta solid solution at any given hydriding temperature within the range of up to about 900° C. can be readily determined from the accompanying drawings. For example, if it is desired to carry out hydriding at 800° C., the maximum hydrogen concentration in the beta solid solution at this temperature is about 50 atom percent. By considering the isothermic curve for 800° C. in the graph of FIGURE 2, it will be noted that in order to obtain a 50 atom percent saturation in the beta phase, the pressure must be about 130 mm. of mercury. However, this pressure can usually be exceeded by about 100 mm. of mercury, in view of hydriding rate-depressing contaminants normally present in the reaction chamber. Thus, the excess pressure will compensate for the rate-depressing effect of the contaminants. Hydriding beyond the beta phase will be accomplished with higher hydrogen pressures.

Now referring more particularly to the method of the present invention, after the reaction chamber has been heated to the hydriding temperature, preferably from about 760° C. to about 800° C., the zirconium metal or alloy piece is initially hydrided by contacting it with controlled amounts of hydrogen passed into the chamber in small increments. The initial hydriding takes place over an extended period of time and is complete in, for example, about 15 to 20 hours. During that time, the hydrogen pressure builds up from zero to substantially atmospheric pressure due to the introduction of the hydrogen in small increments. For example, in a typical mullite reaction chamber approximately 2 inches by 2¼ inches by 24 inches fitted with quartz and caps and containing a molybdenum boat holding a 14 inch by 1½ inch zirconium metal alloy piece having a ¼ inch hole in the center thereof, the hydrogen may be introduced by 75 to 100 spaced admissions of about 0.06 cubic foot each, so that the flow to the chamber is about 0.5 cubic foot per hour. It will be understood that other suitable increments of hydrogen may be introduced, so long as the overall rate of introduction of hydrogen into contact with the piece is kept sufficiently low to provide uniform hydriding without cracking.

The gradual build-up of hydrogen in the chamber causes the hydriding to pass from the alpha phase to and ultimately through the beta phase, thereafter through the beta plus gamma phase and into the gamma phase. Hydrogen build-up is sufficiently slow to allow substantial completion of hydriding in each phase before proceeding into the next phase or region. Thus, the dissociation pressure for the beta solid solution of zirconium is not substantially exceeded before hydriding in the beta phase is completed. When the rate of use of hydrogen in the chamber has dropped to zero, hydriding is complete at the given temperature, and at the desired pressure (approximately atmospheric) the hydride is in the gamma phase and the hydrogen-to-zirconium atom ratio is approximately 1.

Further increases in such ratio are thereupon effected by progressively lowering the temperature in the reaction chamber while continuing to introduce hydrogen into the chamber at a slow rate, such as previously described for hydriding in the 760° C. to 800° C. range. In each instance, hydriding can be substantially completed before the temperature need be lowered. Thus, for example, the temperature can be lowered 30° C. from 760° C. to 730° C. and with the above-described mullite chamber, hydrogen can be introduced at the rate of 0.5 cubic foot per hour in increments of, for example, 0.06 cubic foot until in about 6 hours hydriding in the gamma phase is complete, i.e., absorption of hydrogen decreases to zero and the hydrogen pressure is about atmospheric pressure, i.e., 760 mm. of mercury. At this point, the hydrogen-to-zirconium atom ratio is from about 1.6:1 to about 1.8:1 and the hydrogen is uniformly distributed in the hydride. Thus, in approximately 20 to 25 hours, a solid zirconium metal piece can be hydrided to a high hydrogen-to-zirconium ratio without cracking, flaking, etc. It will be understood that, as previously explained, if the piece is more than 1 inch in diameter, it should be drilled or otherwise shaped to reduce the thickness thereof to not more than 1 inch before hydriding, in the event hydriding to a hydrogen-to-zirconium value of 1.5 or more is to be carried out. This is to prevent cracking of the piece during hydriding due to differential expansion between the outside and inside of the piece.

Further hydriding can be carried out by again lowering the temperature of the piece and continuing the previously described introduction of hydrogen in small increments over an extended period of time to complete hydriding in the gamma phase.

In order to assure prevention of the formation of a significant amount of the described zirconium hydride 2.0 or $ZrH_2$, after the hydriding is completed, the reaction chamber is evacuated of hydrogen to a low pressure, for example, 1 to 2 microns of mercury. Thus, after hydriding to a hydrogen-to-zirconium ratio of 1 to 1.5 has been effected, evacuation of the reaction chamber is carried out when the chamber temperature is not lower than about 450° C., preferably between 450° C. and 500° C. If the zirconium has been hydrided to a hydrogen-to-zirconium ratio of 1.8, the reaction chamber is evacuated when the chamber temperature is not lower than about 425° C. It is preferred to allow the reaction chamber containing the hydride to cool under the low pressure before removing the hydride. It is desirable to hold the hydride at about 500° C. for 2 hours to anneal out internal stresses in the hydride. Thereby, cracking of the finished zirconium hydride piece is avoided.

It will be understood that although reference has primarily been made to zirconium pieces, zirconium alloy pieces can be successfully hydrided to zirconium hydride in a manner substantially identical to that described for zirconium pieces. Phase diagrams of the particular ternary system involved, and absorption isotherms for such systems may be referred to. Thus, zirconium alloy pieces containing substantial amounts of uranium have been successfully hydrided to solid uranium-zirconium hydride pieces of predetermined size and shape without cracks or other flaws.

The following examples further illustrate certain features of the present invention.

Example 1

Five bars of metal alloy containing approximately 92 weight percent of zirconium and 8 weight percent of uranium were machined to cylindrical shape 14 inches long and 1.5 inches in diameter, with a 0.25 inch hole extending longitudinally through the center thereof.

Each bar was degreased by immersion in liquid trichlorethylene and abrading the surface thereof, while immersed, with steel wool. Each bar was then etched for 5–10 minutes in a solution comprising about 50 percent by volume of water and about 49 percent by volume of nitric acid, and the remainder hydrofluoric acid, so as to remove traces of copper and oxides or other skin contamination. The bars were then removed from the etch solution, rinsed in a water bath, drained, rinsed in an alcohol bath, air dried and weighed.

Each bar was then loaded into a separate reaction chamber comprising a mullite tube (2 inch internal diameter, 2.25 inch outer diameter, 24 inch length), which was then closed at one end and fused to a Pyrex glass adapter (2.25 inch internal diameter, 2.5 inch outer diameter). The tube had a male taper at the other end, to which was connected a Pyrex glass end cap with a female taper and a valved port for a vacuum and hydrogen train. Thus, the bar in the mullite tube was sealed from the environment. Before the bars were placed in the reaction chambers, each chamber was cleaned with acetone or ethyl alcohol, air dried, and outgassed at 800° C. for 4 hours while under a vacuum. A molybdenum boat formed from a sheet of clean molybdenum cut to size and roll-bent was used to form a sliding barrier between each bar and its reaction chamber. Each molybdenum boat was vapor blasted to remove surface oxide and cleaned in acetone or ethyl alcohol before use.

In each instance the bar was placed in the clean molybdenum boat and the bar and boat were inserted into the reaction chamber. A ceramic shield was placed in front of the bar to prevent radiant heat loss while at reaction temperature, and the reaction chamber was sealed by placing the end cap over the male tapered fitting. A high temperature vacuum grease was used on the tapered surface to insure a hydrogen-tight joint.

Each reaction chamber was then loaded into an electric furnace, the vacuum-hydrogen line was connected into a hydrogen-tight drying and purification train and the reaction chamber was evacuated by means of a mechanical vacuum pump. A high vacuum pumping system was then cut in on the line. Said system comprised a carbon dioxide and acetone cold trap, a mercury diffusion pump and a mechanical vacuum pump in series. The reaction chamber was evacuated to 5 microns or less. The drying and purification train was prepared, and included a line containing a dessicant such as silica gel or calcium sulfate, as well as a line including activated charcoal and glass wool, said latter line being immersed in liquid nitrogen.

Each reaction chamber was then heated to 760° C. over a period of about 1 hour. When the indicated temperature was reached, the vacuum system was turned off and hydrogen was admitted at a rate of 0.5 cubic foot per hour to each reaction chamber, in equally spaced increments of 0.06 cubic foot, it taking only a few seconds to introduce each increment. The reaction was carried over an 18 hour period, at the end of which time approximately atmospheric pressure had been reached within the reaction chamber and the rate of use of the hydrogen had dropped to zero, i.e., the hydriding reaction was complete at that temperature.

The temperature of each reaction chamber was then lowered to 730° C., and hydrogen was then admitted to each reaction chamber at the indicated rate of 0.5 cubic foot per hour, in increments of 0.06 cubic foot until the hydriding reaction was completed at that temperature, as indicated by no further absorption of hydrogen, i.e., no decrease in hydrogen pressure. By the time the reaction was completed, that is, in about 6 hours, the hydrogen pressure was about atmospheric pressure. This treatment resulted in the production of zirconium hydride in the alloy bars, which had a hydrogen-to-zirconium atom ratio of about 1.8:1.

Each reaction chamber was allowed to cool to about 450° C. without further admissions of hydrogen, then was evacuated to remove the hydrogen, until the pressure therein was only 1–2 microns of mercury. The reaction chambers were then allowed to cool over a 12 hour period to ambient temperature, whereupon the hydrided bars were removed and examined. Each of the 5 bars was found to be crack-free, uniform in size and shape and also uniform in weight, appearance and distribution of hydrogen therein and extent of hydriding thereof. The bars were of special utility in the fabrication of fuel element for neutronic reactors, affording reduced migration of fission products therefrom, decreased distortion due to phase transformation at high temperatures and increased thermal conductivity.

*Example II*

Five bars of identical size and shape to the bars described in Example I, but consisting essentially of zirconium metal, not an alloy, were treated in accordance with the procedure and equipment generally as described in Example I. However, the initial hydriding temperature was 800° C., the initial hydriding time was 15 hours and the volume of each hydrogen increment was 0.09 cubic foot.

After initial hydriding was completed in each reaction chamber to gamma zirconium at atmospheric pressure and 800° C., the hydriding temperature was lowered to 760° C. and hydriding was again carried to completion in the previously described manner. Subsequent hydriding stages were carried out to completion in each reaction chamber at 720° C., 680° C., 640° C., 600° C., 560° C. and 520° C., hydriding in each stage being conducted in the previously described manner with respect to hydrogen admissions, etc. Each reaction chamber was then allowed to cool to 425° C. without further admission of hydrogen thereto, whereupon each reaction chamber was evacuated to a pressure of 1 micron of mercury, and was allowed to cool 10 hours to ambient temperature. The bars of zirconium hydride were withdrawn and found to be highly satisfactory and substantially the same as the hydrided bars described in Example I, except for the absence of the alloying metal and the higher hydrogen-to-zirconium atom ratio of 1.85:1. Uniformity of hydriding was confirmed metallographically. The bars were found to be suitable for use in neutronic reactors.

From the above, it is apparent that hydriding of zirconium metal and alloy pieces can be successfully carried out to a higher hydrogen-to-zirconium atom ratio without cracking of the pieces, than heretofore possible. The desired hydriding is accomplished by contacting the pieces in a substantially contaminant-free reaction zone or chamber with controlled amounts of hydrogen delivered in small spaced increments. Thus, cracking of the pieces during hydriding is prevented, hydriding in each phase or region of the hydrogen-zirconium system being carried to substantial completion before substantial hydriding in the next successive phase. The hydrogen pressure slowly builds up to about atmospheric pressure at the hydriding temperature so as to ultimately effect hydriding in the gamma zirconium phase. The hydriding is continued by progressively lowering the hydriding temperature while supplying additional hydrogen to the system in small increments, until the desired degree of hydriding is effected. Hydrogen is removed from the reaction zone during subsequent cooling to prevent formation of $ZrH_2$ and consequent cracking, flaking and powdering of the product.

Large pieces of zirconium metal and alloy can be successfully treated so as to provide crack-free hydrided pieces of predetermined size and shape ready for immediate use without shaping operations. Pieces having diameters more than 1 inch are drilled so as to reduce the effective diameters or thickness thereof, to not more than 1 inch, where hydriding to a hydrogen-to-zirconium atom ratio of 1.5 or more is carried out, so as to obtain successful hydriding in a reasonable amount of time. Further objects and advantages of the present invention are as set forth in the foregoing.

Various of the features of the present invention are set forth in the appended claims.

What is claimed is:

1. A method of hydriding a metal shape containing at least about 50 percent by weight of zirconium and a substantial concentration of uranium in a stepwise fashion to produce a crack-free shape comprising, raising the temperature of said metal shape disposed within an evacuated zone to a hydriding temperature of at least about 700° C. and not more than about 800° C., introducing hydrogen into contact with said shape, the admission of said hydrogen being regulated so that the hydrogen pressure is maintained below the equilibrium dissociation pressure of the saturated hydrogen-zirconium system for each of the phases of the hydrogen-zirconium system at said hydriding temperature, substantially, completely and uniformly hydriding said shape throughout its cross-section for each of said phases of the hydrogen-zirconium system at said temperature before hydriding is initiated to the next succeeding of said phases, completing hydriding for said temperature in the gamma phase of the hydrogen-zirconium system, lowering the temperature while continuing said introduction of hydrogen, whereby a crack-free unbroken metal shape containing zirconium hydride is provided.

2. A method of hydriding a metal shape containing at least about 50% by weight of zirconium and a substantial concentration of uranium in a stepwise fashion to produce a crack-free shape comprising, raising the temperature of said metal shape disposed within an evacuated zone to a hydriding temperature of at least about 700° C. and not more than about 800° C., substantially, completely and uniformly hydriding said shape in each of the phases of the hydrogen-zirconium system at said hydriding temperature by introducing hydrogen into contact therewith in a large number of small, spaced apart, incremental volumes, the admission of said volumes being regulated so that the hydrogen pressure is maintained below the equilibrium dissociation pressure of the saturated hydrogen-zirconium system for each of said phases at said hydriding temperature such that said shape is substantially, completely and uniformly hydrided throughout its cross-section for each of said phases of the hydrogen-zirconium system at said temperature before hydriding is initiated to the next succeeding of said phases, completing hydriding for said temperature in the gamma phase of the hydrogen-zirconium system, lowering the temperature while continuing said introduction of hydrogen in small increments, whereby a crack-free unbroken metal shape containing zirconium hydride is provided.

3. The method of claim 1 wherein said metal shape is completely hydrided at at least some of said lower temperatures.

4. The method of claim 3 wherein during lowering of the temperature, the temperature is lowered in increments of 30° C.

5. The method of claim 4 wherein said zone is evacuated after complete hydriding and said introduction of hydrogen is terminated after establishing a hydrogen to zirconium atom ratio of from 1.5 to 2.0.

6. The method of claim 5 wherein said metal shape comprises about 92 percent by weight of zirconium and about 8 percent by weight of uranium.

7. The method of claim 2 wherein the hydrogen is introduced at a rate of up to about 0.05 cubic foot per hour.

8. A method of hydriding a metal shape containing at least about 50% by weight of zirconium and a substantial concentration of uranium at a hydriding temperature of at least about 700° C. and not more than about 800° C. to produce a crack free shape, which method comprises the steps of forming a hole in said metal shape of a size sufficient to reduce the wall thicknesses of said shape to less than one inch, hydriding said shape at said temperature by introducing hydrogen into contact therewith such that hydriding in each of the phases of the hydrogen-zirconium system for said temperature is substantially completed before any substantial hydriding in the next succeeding of said phases of the system is effected, lowering the temperature while continuing said introduction of hydrogen, whereby a crack-free unbroken metal shape containing zirconium hydride is provided.

9. The method of claim 8 wherein the hydrogen pressure in contact with said metal shape is maintained below the equilibrium dissociation pressure of the hydrogen-zirconium system at said temperature for each of said phases until hydriding has been substantially completed in said phase.

10. The method of claim 8 wherein said hydrogen is introduced in a large number of small spaced apart volumes, the admission of said volumes being regulated so that the hydrogen pressure is maintained below the equilibrium dissociation pressure of the saturated hydrogen-zirconium system for each of said phases.

11. The method of claim 8 wherein said metal shape is completely hydrided at said temperature in the gamma zirconium phase.

12. The method of claim 8 wherein said metal shape comprises about 92 percent by weight of zirconium and about 8 percent by weight of uranium.

13. The method of claim 8 wherein said shape is a cylindrical rod.

References Cited in the file of this patent

UNITED STATES PATENTS

| | | |
|---|---|---|
| 2,929,707 | Weeks et al. | Mar. 22, 1960 |
| 3,018,169 | Vetrano | Jan. 23, 1962 |
| 3,019,176 | McReynolds | Jan. 30, 1962 |
| 3,070,526 | Merten | Dec. 25, 1962 |

OTHER REFERENCES

W. B. Blumenthal's "The Chemical Behavior of Zirconium," pages 31 and 77–82 inclusive. D. Van Nostrand Co., Inc., N.Y. Copy in U.S. Patent Office Scientific Library or Div. 59.

J. W. Mellor's "A Comprehensive Treatise on Inorganic and Theoretical Chemistry," vol. 7, 1927 ed., page 114. Longmans, Green and Co., publishers. Copy in U.S. Patent Office Scientific Library.

2nd Geneva Conference on Atomic Energy, vol. 6, September 1958, pp. 111–115.

Nuclear Science Abstract No. 7727, vol. 13, May 1959. Copy in Group 220–C.

Nuclear Fuel Elements by Hausner et al., November 1959, Reinhold Publishing Corp., pages 80–83. Copy in Library.